United States Patent [19]

Hashimoto et al.

[11] Patent Number: 5,153,835
[45] Date of Patent: Oct. 6, 1992

[54] FAIL SAFE DEVICE FOR TEMPERATURE SENSOR

[75] Inventors: Toru Hashimoto; Masashi Chino; Akira Takahashi, all of Kyoto, Japan

[73] Assignee: Mitsubishi Jidosha Kogyo Kabushiki Kaisha, Tokyo, Japan

[21] Appl. No.: 498,041

[22] Filed: Mar. 22, 1990

[30] Foreign Application Priority Data

Jul. 29, 1988 [JP] Japan .................. 63-188377

[51] Int. Cl.$^5$ ................ F02D 41/22; G06F 15/20
[52] U.S. Cl. ................ 364/431.11; 364/557; 364/571.01; 364/550; 123/479; 340/507; 73/117.3
[58] Field of Search ........ 364/424.03, 431.11, 364/550, 571.01, 571.02, 571.03, 571.04, 571.05, 571.06, 571.07, 571.08, 557; 371/14; 73/116, 117.2, 117.3, 118.1; 123/479; 340/507, 635

[56] References Cited

U.S. PATENT DOCUMENTS

| | | |
|---|---|---|
| 4,069,712 | 1/1978 | Armstrong et al. |
| 4,546,646 | 10/1985 | Takahashi .............. 73/117.3 |
| 4,780,826 | 10/1988 | Nakano et al. .......... 364/431.11 |
| 4,949,078 | 8/1990 | Ito et al. ............. 364/424.03 |

Primary Examiner—Parshotam S. Lall
Assistant Examiner—V. Trans
Attorney, Agent, or Firm—Abelman Frayne & Schwab

[57] ABSTRACT

An engine control system for controlling an engine in response to an output from a temperature sensor for detecting a coolant temperature of the engine, comprising temperature sensor output monitoring device for monitoring an output of the temperature sensor during operation of the engine, temperature sensor fail judging device for judging the temperature sensor to be failed when the temperature sensor output monitoring device does not detect for a predetermined length of time a change in output of the temperature sensor corresponding to an increase in coolant temperature while the temperature sensor is outputting a signal corresponding to the coolant temperature during the operation of the engine, and dummy signal outputting device for outputting a dummy signal corresponding to a predetermined temperature in place of an output signal from the temperature sensor when the temperature sensor is judged as failed by the temperature sensor fail judging device, which, in addition to engine control with a normal temperature sensor, can detect a malfunction of the temperature sensor due to a short circuit, an open circuit, or a resistance increase to fix the temperature sensor output, thereby providing positive engine control, and enables fixing of the engine speed to a desired value in the idle rotation speed control, suppression of an unnecessary fuel enrichment in the fuel control, and suppression of an advance in ignition timing in the ignition control.

21 Claims, 14 Drawing Sheets

FAIL SAFE DEVICE FOR TEMPERATURE SENSOR

FIELD OF THE INVENTION

This invention relates to a fail safe device for a temperature sensor (hereinafter referred to as a water temperature sensor) for detecting the coolant temperature (hereinafter referred to as a cooling water temperature) of an engine when a malfunction occurs in the temperature sensor, more specifically, to a fail safe device which reflects output information of the water temperature sensor to idle speed control, fuel control, and ignition timing control which handle the cooling water temperature as input information.

BACKGROUND OF THE INVENTION

A vehicle is equipped with a water temperature sensor for detecting the cooling water temperature of an engine. The cooling water temperature information detected by the water temperature sensor is used as input information for various controls for controlling the operation condition of the engine such as an idle speed control (hereinafter referred to as ISC) for controlling an idling speed of the engine always to an optimal value, a fuel injection control (hereinafter referred to as fuel control) for determining the amount of fuel according to the operation condition of the engine to control an air/fuel ration to an optimal value, and an ignition timing control (hereinafter referred to as ignition control) for determining an optimal ignition timing.

An example of the water temperature sensor will be described with reference to Fig. 12. The water temperature sensor comprises a thermistor 1 which is a negative resistance element for varying the voltage dividing ratio and two voltage dividing resistors 2 (2.2 kΩ and 39 kΩ in the figure) connected in series. A 5 V reference voltage is divided to 4.7 to 0.1 V according to a change in 46 water temperature, that is, a change in resistance of the thermistor 1.

The divided voltage according to the cooling water temperature generated by the water temperature sensor is supplied as input information for various controls to an electronic control unit (hereinafter referred to as ECU) through an A/D converter (not shown).

However, in such a water temperature sensor, the sensor output may become out of the setting range of 4.7 to 0.1 V. That is, even with a normal cooling water temperature, an open circuit may occur in the thermistor 1 to increase the resistance to nearly an infinite value, or a short-circuit may occur to decrease the resistance of the thermistor 1 nearly to zero. Such phenomena may lead to outputs of information of a much higher or lower temperature than the actual temperature, resulting in a malfunction in various controls for controlling the operation condition of the engine.

For example, if the resistance of the thermistor 1 is nearly zero due to a short-circuit, a too lower water temperature information will be outputted, which results in the following malfunctions:

(1) ISC

An intake air control valve for controlling the intake air amount of the engine moves so that in intake path is opened to increase the engine speed and the cooling water temperature. As a result, the engine speed is increased exceeding the desired value.

(2) Fuel control

The too lower water temperature information promotes unnecessary enrichment of the fuel/air mixture, decreasing the mileage and resulting in increased contamination of exhaust gas.

(3) Ignition control

The condition is determined as a cold-state operation, and the ignition timing is advanced, which may lead to occurrence of a knocking.

To eliminate such a problem, when a water temperature sensor output voltage of higher than 4.7 V is detected which indicates an open circuit or when a voltage of lower than 0.1 V is detected which indicates a short-circuit, it is judged as a failure in the water temperature sensor, various controls are performed by a dummy signal output corresponding to a cooling water temperature of 80° C., and a diagnosis check lamp is lit to inform the malfunction to the driver.

Other than the above-described open circuit and short circuit, there is a case that the water temperature sensor is momentarily cut off. This phenomenon is that, as the output of the water temperature sensor decreases with increasing water temperature as shown in FIG. 13 (a), halfway the water temperature sensor output momentarily increases to give an impulse output. This momentary cut-off is caused by a momentary disconnection due to vibrations of the like of any of a plurality of connectors 3 from the water temperature sensor to the ECU. To reduce effects of such a momentary cut-off, the water temperature sensor output is averaged. Specifically, where $WT_n$ is water temperature information used for a n'th control, $WT_R$ is water temperature information of a n'th the detection, and K is a constant, water temperature is obtained by the following equation:

$$WT_n = (1-K)\, WT_{n-1} + K \cdot WTR$$

In other words, averaging is made so as to eliminate an impulse output shown in FIG. 13 (a).

Although open circuit, short-circuit, and momentary cut-off can be treated by the above detection methods and averaging, there are more important problems. Open circuit and shor-circuit are extreme cases, and momentary cut-off can be removed by averaging. However, there is a case of a gradual change with time, which tends to be looked over and result in a major malfunction when it becomes conspicuous. For example, there is a phenomenon in which a resistance is added to the thermistor as shown in FIG. 14(a). As shown in FIG. 14(a), when a poor soldering or a poor contact occurs in the water temperature sensor and its associated circuit which contains soldered portions and conncetors 3 (FIG. 13(a)) casued by expansion or oxidation due to an increase in temperature or vibrations, it becomes equivalent to the addition of resistances $R_1$ to $R_4$ though it does not result in a momentary cut-off or open circuit, and the resistance of the thermistor 1 tends to always become increased. As a result of this increase in resistance, from the characteristics shown in FIG. 14(b), despite that the water temperature sensor output must be decreased with increasing cooling water temperature, the water temperature sensor output remains high even when the cooling water temperature increases.

As a result, despite that the actual cooling water temperature is 80° C., for example, and the engine is warmed up, if the high output voltage is judged as that from normal characteristics, the cooling water temperature is determined as to be, for example, 20° C., resulting in the above-described malfunctions of various control systems for a low cooling water temperature.

Therefore, in performing various controls in response to the cooling water temperature measured by a water temperature sensor using a thermistor, an improvement has been required for malfunctions in various control systems not only when an open circuit or short-circuit occurs but also when the resistance abnormally increases.

DISCLOSURE OF THE INVENTION

In accordance with the present invention, there is provided an engine control device for controlling an engine in response to an output from a temperature sensor for detecting a coolant temperature of the engine, comprising temperature sensor output monitoring means for monitoring an output of the temperature sensor during operation of the engine, temperature sensor fail judging means for judging the temperature sensor to be failed when the temperature sensor output monitoring means does not detect for a predetermined length of time a change in output of the temperature sensor corresponding to an increase in coolant temperature while the temperature sensor is outputting a signal corresponding to the coolant temperature during the operation of the engine, and dummy signal outputting means for outputting a dummy signal corresponding to a predetermined temperature in place of an output signal from the temperature sensor when the temperature sensor is judged as failed by the temperature sensor fail judging means.

BRIEF DESCRIPTION OF THE DRAWINGS

FIGS. 1 to 11 related to embodiments of the present invention .

FIGS. 1 and 2 are schematic views showing structure of an engine system.

FIG. 3 is a schematic view showing hardware of an ECU.

FIG. 5 is a graph showing output characteristics of a water temperature sensor.

FIG. 6 is a flow chart of a bypass type ISC main routine.

FIG. 7 is a flow chart of a stepping motor drive routine as a bypass type ISC subroutine.

FIG. 8 is a flow chart of a direct-acting type ISC main routine.

FIG. 9 is a flow chart of a fuel control main routine.

FIG. 10 is a flow chart of a solenoid valve control routine as a fuel control subroutine.

FIG. 11 is a ignition control flow chart.

FIG. 12 to 14 relate to the prior art.

FIG. 12 is a circuit diagram showing a water temperature sensor.

DESCRIPTION OF THE PREFERRED EMBODIMENTS

Figure 1:
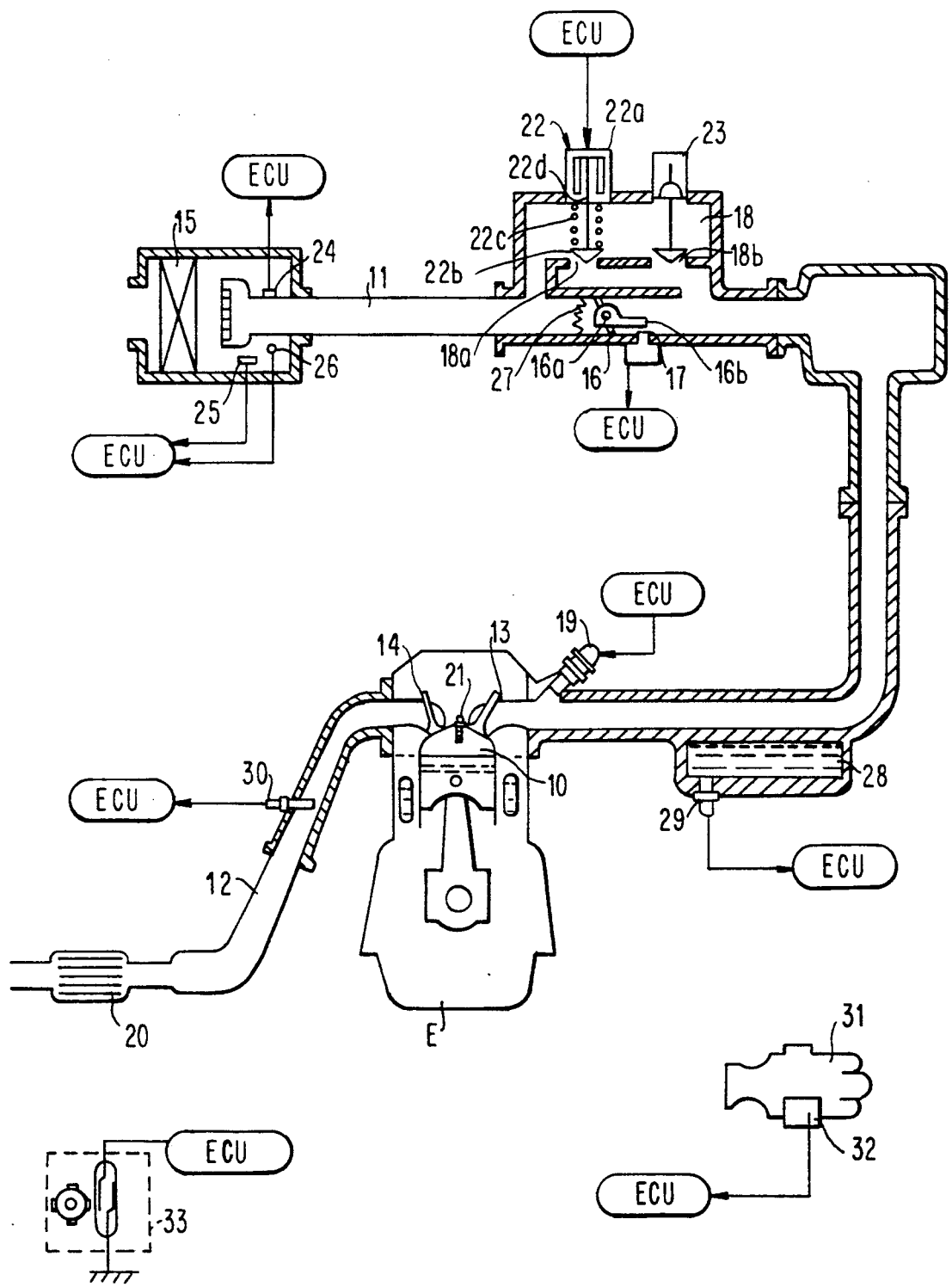
Figure 2:
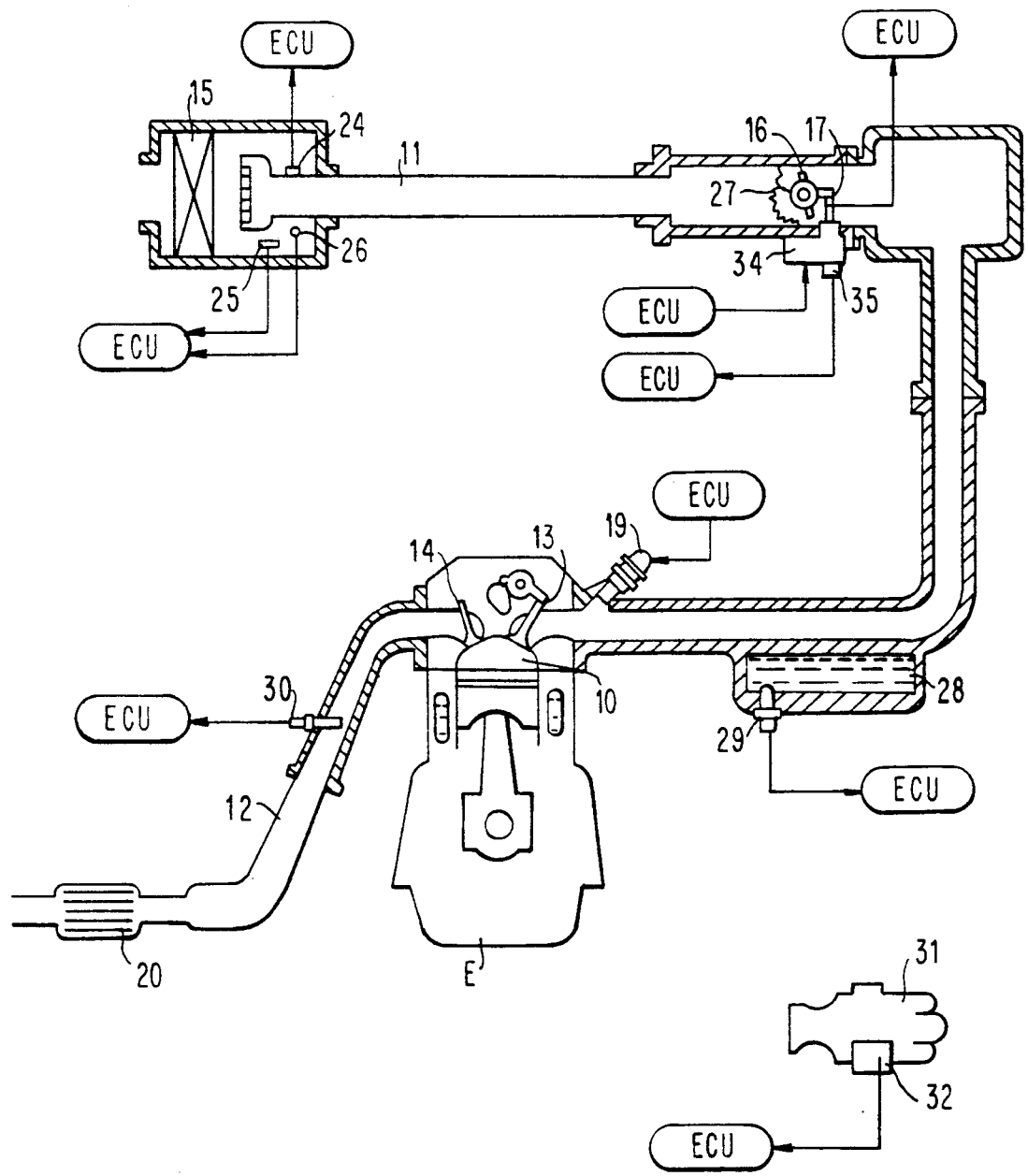

Preferred embodiments of the water temperature sensor fail safe device according to the present invention will now be described with reference to FIGS. 1 to 11. First, an engine system equipped with the water temperature sensor fail safe device will be described. FIG. 1 shows an example which is equipped with an ISC bypass, and FIG. 2 shows an exampel which is equipped with a direct-acting type ISC. Mainly FIG. 1 will be described here.

An engine E has an intake path 11 and an exhaust path 12 connecting to a combustion chamber 10. Communication between the intake path 11 and the combustion chamber 10 is controlled by an intake valve 13. Communication between the exhaust path 12 and the combusiton chamber 10 is controlled by an exhaust valve 14.

The intake path 11 is provided, in the order from the upstream, with an air cleaner 15, a throttle valve 16, an idle switch (hereinafter referred to as IDSW) 17 for detecting that the throttle valve 16 is at a closed side stop position, a bypass path 18 is formed parallel to the intake path 11 of which an intake air amount is controlled by the throttle valve 16, and an electromagnetic fuel injection valve 19. The exahust path 12 is provided, in the order from the upstream side, with an exhaust gas cleaning catalyst converter 20 and a muffler (not shown). In the combustion chamber of the engine E is protrudingly provided an ignition plug 21.

The throttle valve 16 is connected with a throttle lever 16b through 16a supporting the throttle valve 16 at the outside of the intake path 11, and an end of the throttle lever 16b contacts against the IDSW17 when the throttle valve is at closed side (e.g., fully closed condition).

The bypass 18 is provided with an actuator 22 and a fast idle valve 23, disposed parallel to each other.

The actuator 22 comprises a valve body 22b as an air amount control valve which open and close an opening 18a formed in the bypass 18, a return spring 22c for urging the valve body 22b toward a direction to close the opening 18a, and a connecting rod 22d for connecting a stepping motor 22a and the valve body 22b.

When the stepping motor 22a rotates, the rod 22d moves along the axial direction to vary the valve opening. The fast idle air valve 23 is a wax type which, when the engine temperature is low, contracts to open the opening 18b formed in the bypass 18 and, as the engine temperature increases, extends to close the opening 18b.

Furthermore, this engine system is provided with various sensors for controlling the engine E. First, the intake path 11 is provided, in the order from the upstream, with an air flow sensor for detecting an intake air amount, an intake temperature sensor 25 for detecting an intake air temperature, an atmospheric pressure sensor 26 for detecting an atmospheric pressure, and a throttle sensor 27 for detecting the opening of the throttle valve 16. A cooling water path 28 formed at the side of the intake path 11 is provided with a water temperature sensor 29 for detecting a cooling water temperature of the engine. The exhaust path 12 is provided with an $O_2$ sensor 30 for detecting an oxygen concentration of exhaust gas. Furthermore, a distributor 31 is provided with a rotation speed sensor 32 for detecting a rotation speed of the engine E, a vehicle speed sensor 33 for detecting a vehicle speed, and the like.

In addition to the above, there are provided the IDSW17, an ignition switch (hereinafter referred to as IGSW) and the like as switches for detecting the condition of the engine E. Detection signals from these sensors and switches are inputted to an electronic control unit ECU.

The above arrangement is for an engine system equipped with a bypass. FIG. 2 shows a direct-acting ISC (a system to perform ISC by the throttle valve itself). Referring to FIG. 2, the throttle lever 16b for moving the throttle valve 16 is rotated by a DC motor 34, and its rotation is controlled by an output of the water temperature sensor 29, thereby controlling the throttle opening. The DC motor 34 is provided with a motor position sensor 35, which detects a rotational position of the motor and a position corresponding to the throttle opening, and position feedback is made through the ECU.

As another feedback method, a rotation speed feedback is also possible in which the rotation speed of the DC motor 34 corresponding to the throttle opening is feedback-controlled by the rotation speed sensor 32 (FIG. 1) for detecting a rotation of a crank shaft, rather than the motor position detection.

Thus, in FIG. 2, the throttle valve 16 is directly opened and closed to perform ISC.

Figure 3:
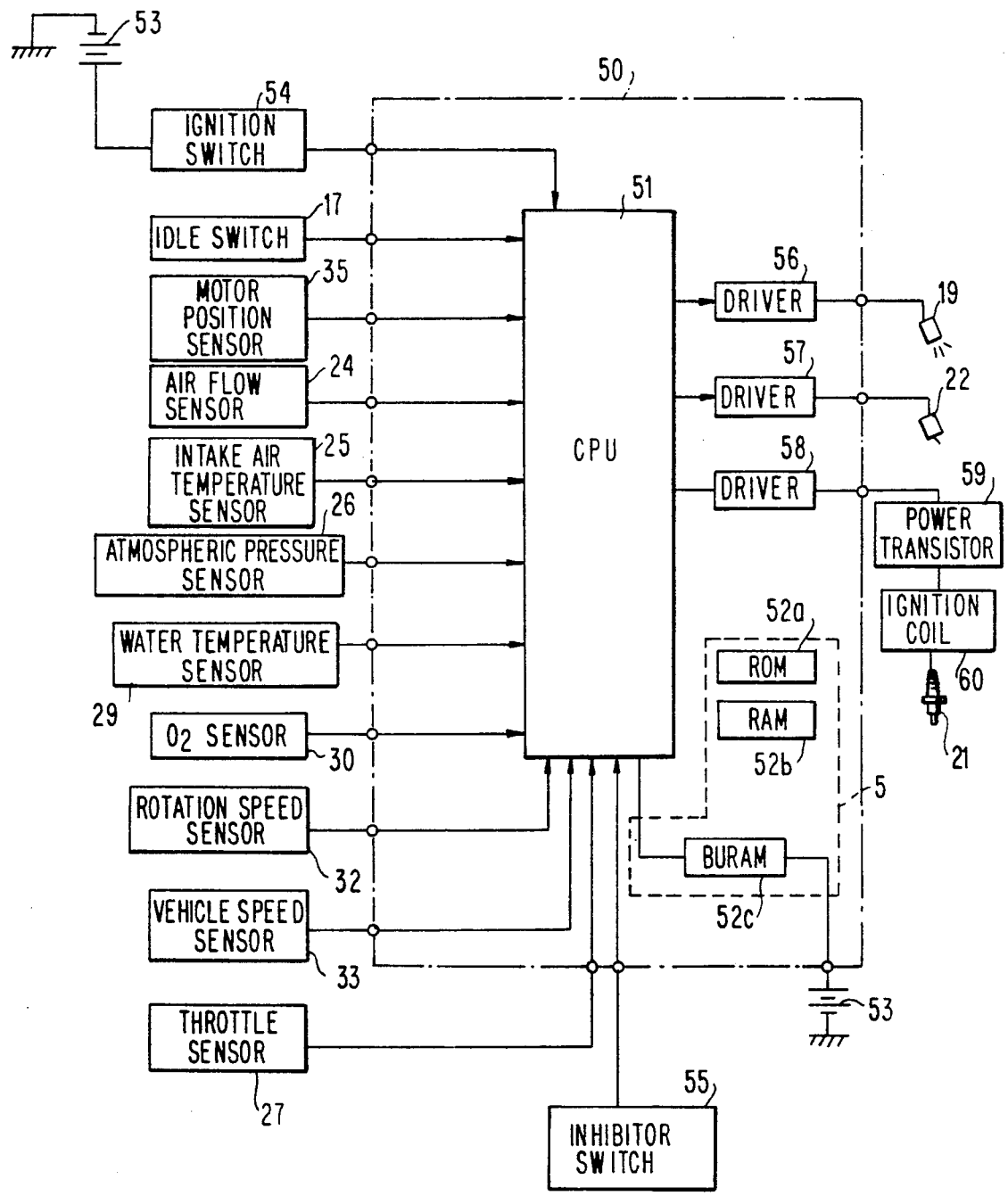

The engine systems shown in FIGS. 1 and 2 have been outlined above. FIG. 3 shows hardware arrangement of an ECU. Referring to FIG. 3, an ECU 50 comprises, centering on a central processing unit (CPU) 51 and a memory 52 (including maps), an input side and an output side. The memory 52 comprises a ROM 52a for storing program data and fixed value data, a RAM 52b which is updated and rewritten, and a battery back-up RAM (BURAM) 52c as storage means which is directly connected to a battery 53. The input side of the CPU 51 is connected with sensors and switches for inputting input information to the CPU 51 and is provided with an ignition switch 54, an inhibitor switch 55 necessary for automatic speed shift, the IDSW17, the throttle sensor 27, the air flow sensor 24, the intake air temperature sensor 25, the atmospheric pressure sensor 26, the $O_2$ sensor 30, the rotation speed sensor 32, the vehicle speed sensor 33, and the water temperature sensor 29.

The output side of the CPU is provided with a driver 56 for driving the electromagnetic fuel injection valve 19, a driver 57 for driving the stepping motor 22, and a driver 58 for driving a power transistor 59. The power transistor 59 is to turn on/off an ignition coil for applying a high voltage to the ignition plug 21.

Based on the hardware shown in FIGS. 1 to 3, fail detection of the water temperature sensor 29 will be described with reference to a flow chart shown in FIG. 4.

Initialization is performed in step a1 where flags $F_f$, $F_{CR}$, $F_{CR50}$, and $F_{50}$ are reset. Then, a cooling water temperature $WT_R$ is read in step a2. $WT_n$ is determined by the above-described equation $$WT_n = (1-K)WT_{n-1} + K \cdot WT_R$$

$WT_n$ basically represents a latest value of engine cooling water temperature, but moderated by an equation to prevent sharp changes.

Figure 4A:
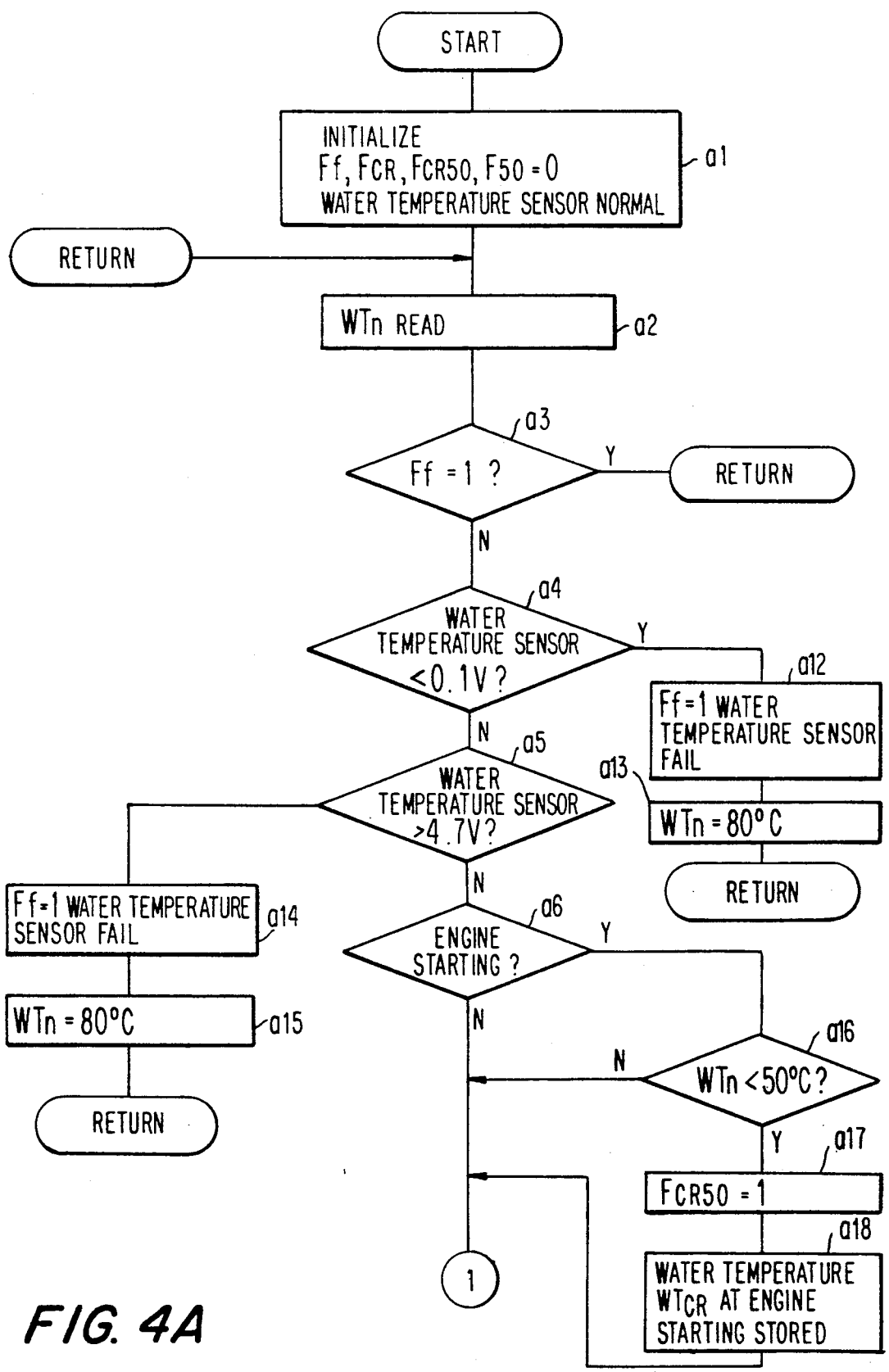
FIGS. 4A and 4b are flow chart of judging a failure of a water temperature sensor.
Figure 4B:
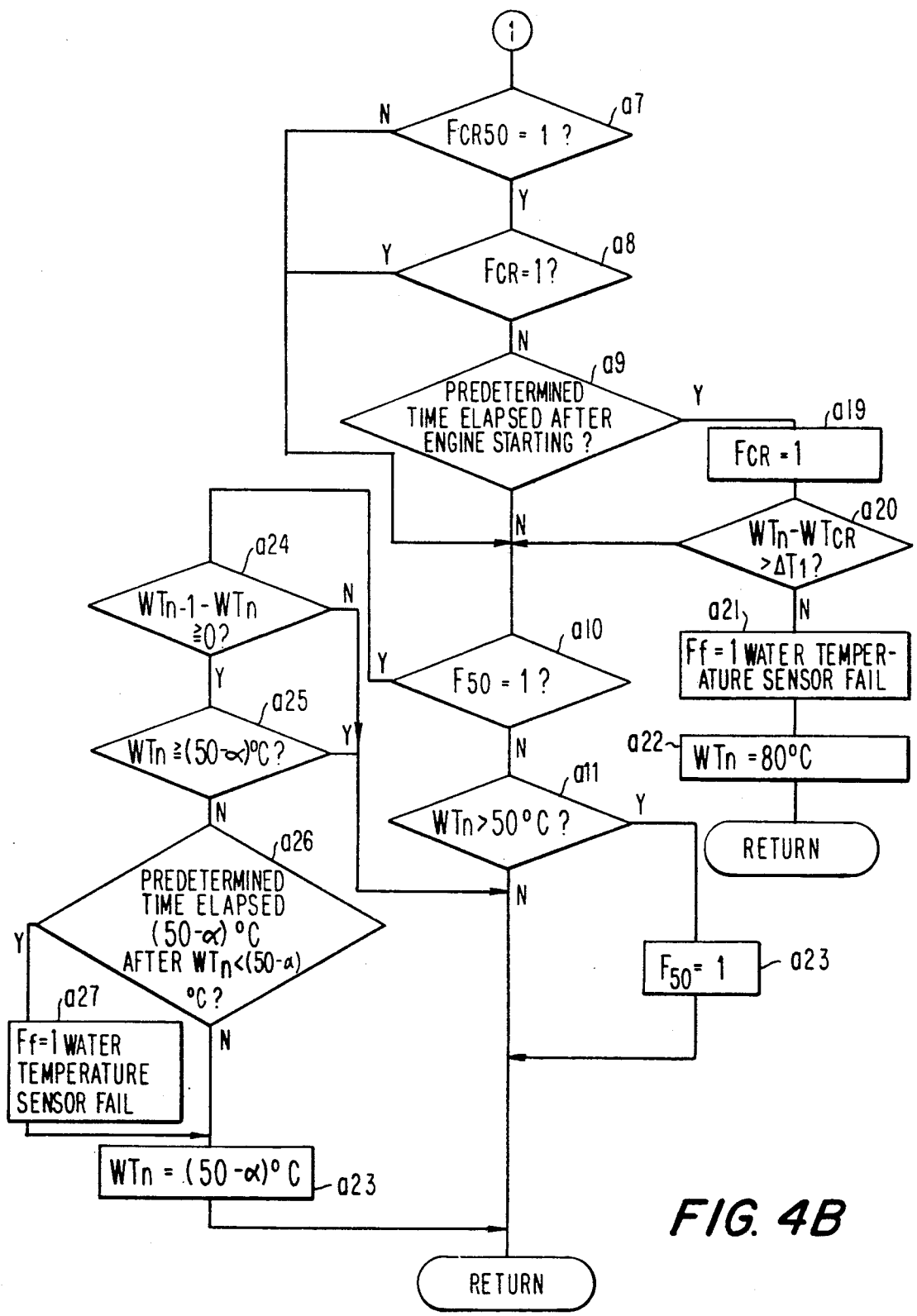

On the other hand, $WT_{CR}$, as shown in step a18 in FIG. 4, represents the actual water temperature only when the engine start condition is detected (that is, final value of $WT_n$ during engine start). Detection of engine start condition is made in a very short period of time and, as a result, the water temperature information at the engine start is maintained. After engine starting is completed and the engine is in normal operation, the value of $WT_n$ gradually varies as the engine cooling water temperature increases as far as the water temperature sensor operates normally. However, the value of $WT_{CR}$ maintains the final value of $WT_n$ at the engine start and does not change.

In step a3, whether or not the flag $F_f$ is set is judged. If set, processing goes to RETURN, and, if reset, processing goes to step a4. The flag $F_f$ is a water temperature sensor fail judgment flag which is set when a water temperature sensor fail occurs.

In step a4, whether or not the output of the water temperature sensor is smaller than 0.1 V is judged. If smaller, it is determined as a short-circuit and processing goes to step a12. In step a12, the flag $F_f$ is set as a water temperature sensor fail and a diagnosis check lamp is lit. In next step a13, $WT_n$ is set to a value corresponding to 80° C. and processing goes to RETURN.

If the water temperature sensor output is 0.1 V or higher in step a4, whether or not the water temperature sensor output is higher than 4.7 V is judged in step a5. If higher, it is determined as an open circuit, and processing goes to step a14. In step a14, the flag $F_f$ is set as a water temperature sensor fail and the diagnosis check lamp is lit. In next step a15, $WT_n$ is set to a value corresponding to 80° C. and processing goes to RETURN.

If the water temperature sensor output is 4.7 V or lower in step a5, processing goes to next step a6 to judge whether or not the engine is in starting operation. If not in the starting operation, that is, if the engine is in operation, processing goes to step a7. If in the starting operation, whether or not $WT_n$ is equal to or lower than 50° C. is judged in step a16. If higher than 50° C., processing goes to step a7. If lower than 50° C., the flag $F_{CR50}$ is set in step a17, and, water temperature $WT_{CR}$ at the beginning of engine operation is stored in step a18, then processing goes to step a7. In this case, the flag $F_{CR50}$ is a starting water temperature judgment flag which is set when the cooling water temperature at the beginning of engine operation is 50° C. or lower. The reason why the temperature condition is used in step a16 is that, if the water temperature is high at the beginning of engine operation, the water temperature decreases when the thermostat is opened which may be judged as the sensor failing in step a20 despite it is normal.

In step a7, whether or not the flag $F_{CR50}$ is set is judged. If reset, processing goes to step a10, and, if set, whether or not the flag $F_{CR}$ is set is judged in next step a8. This flag $F_{CR}$ is a time lapse judgment flag after the beginning of engine operation which is set after a predetermined time lapse from the beginning of engine operation. If the flag $F_{CR}$ is set, processing goes to step a10, and, if reset, whether or not the predetermined time is elapsed is judged in next step a9. If the predetermined time is not elapsed, processing goes to step a10, and, if elapsed, the flag $F_{CR}$ is set in step a19. In step a20, it is judged whether or not there is an increase in water temperature of $\Delta T_1$ after the lapse of a predetermined time from the beginning of engine operation. If there is a temperature increase of $\Delta T_1$, processing goes to step a10. If not, it is judged as a water temperature fail, the flag $F_f$ is set and the the diagnosis check lamp is lit in step a21, $WT_n$ is set to a value corresponding to a water temperature of 80° C., and then processing goes to RETURN.

In step a10, it is judged whether or not the flag $F_{50}$ is set. The flag $F_{50}$ is a cooling water judgment flag after the beginning of engine operation which is set when the cooling water temperature after the beginning of engine operation is higher than 50° C. If the flag $F_{50}$ is reset, whether or not $WT_n$ is higher than 50° C. is judged in step all. If the water temperature is higher than 50° C., the flag $F_{50}$ is set in step a23 and processing goes to RETURN. If the water temperature is 50° C. or lower, processing goes to RETURN. If the flag $F_{50}$ is set in step a10, whether or not $WT_n$ is equal to or lower than the immediately preceding $WT_n$ is judged in step a24. If $WT_n$ is higher than the immediately preceding $WT_n$, processing goes to RETURN. If equal to or lower than the preceding $WT_n$, whether or not $WT_n$ is equal to or higher than $(50-\alpha)°$ C., is judged in step a25.

$\alpha$ is set experimentally in consideration of the following, and basically needs not to be varied once it is set. In the present invention, in order to detect misoperation of the temperature sensor even when it is outputting a value within the normal range, on the assumption that the coolant temperature consistently increases over time to the after-warm-up temperature after the engine starts, the temperature sensor is determined to be in a fail condition (or in an unusual condition through it is not a sensor fail) when: (1) such temperature increasing condition is not detected by the temperature sensor (particularly related to claims 1 to 10), or (2) after a certain temperature is reached, a lower temperature is detected (particularly related to claim 11 and beyond). In the case (2), if the temperature sensor is normal, macroscopically the temperature sensor output should consistently increase, but microscopically would undergo a temporary decrease due to temperature unevenness or the like of the circulating cooling medium. To cope with such a case, it is preferable to determine a sensor fail (or an abnormal condition) when, after a certain temperature (e.g. a setting temperature of 50° C.) is exceeded, when a temperature lower by $\alpha°$ than the setting temperature (e.g. a second setting temperature of $(50-\alpha)°$ C.) is detected. Thus, $\alpha$ is to prevent a wrong fail judgment due to deviation in temperature in the vicinity of the temperature sensor caused by unevenness in temperature or the like of the cooling medium. For a cooling system (or temperature sensor characteristics) which is hard to cause such a deviation, $\alpha=0°$ may be set. On the other hand, in a system which involves such a deviation, $\alpha$ may be set to given an insensitive zone (hysteresis zone) to absorb (or invalidate) such a deviation. As can be seen from the above description, $\alpha$ is basically unnecessary to be varied after it is once set, however, it may be given as a variable according to the engine operation condition when the insensitive zone to absorb such a deviation varies with the engine operation condition (for example, warming-up condition). If $WT_n$ is equal to or higher than $(50-\alpha)°$ C., processing goes to RETURN. If lower than $(50-\alpha)°$ C., it is judged in step a26 whether or not a predetermined time is elapsed after the temperature becomes lower than $(50-\alpha)°$ C. If the predetermined time is elapsed, it is judged as a water temperature sensor fail, the flag $F_f$ is set and the diagnosis check lamp is lit in step a28 and, in step a28, $WT_n$ is set to a value corresponding to a water temperature of $(50-\alpha)°$ C., followed by going to RETURN. If not elapsed, merely $WT_n$ is set to a value corresponding to a water temperature of $(50-\alpha)°$ C. in step a30, followed by RETURN.

The above description is based on a reference water temperature of 50° C. This is an example of cooling water temperature corresponding to a condition where the engine speed does not exceed a desired value nor the engine stops in ISC, and is not restricted to 50° C. Since, in the fuel control or ignition control, a cooling water temperature for an over-rich air/fuel ratio or an over-advanced timing is far lower, e.g., 20° C., it is sufficient to consider the above ISC reference temperature.

Figure 5:
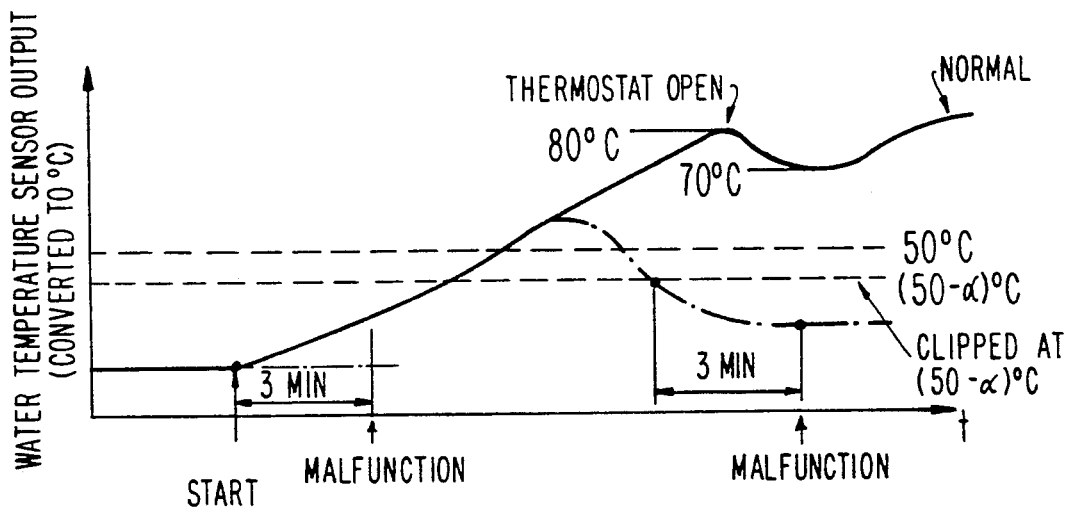

FIG. 5 shows water temperature sensor output characteristics, showing normal characteristics and a malfunction example due to the permanent addition of a resistance in the flow shown in FIG. 4. In FIG. 4, steps a4, a12, and a13 are respective sensor fail detection and fail safe steps for a low resistance value corresponding to a short circuit of the water temperature sensor, and steps a5, a14, and a15 are for a high resistance value corresponding to an open circuit of the water temperature sensor. For an increase in resistance, in the beginning of engine operation shown in FIG. 5, the predetermined time is set to 3 minutes, and sensor fail detection and its fail safe procedure are performed in steps a9, a19, a20, a21, and a22. When the temperature is lower than 50° C., sensor fail detection and its fail safe procedure are performed in steps a10, a24, a25, a26, a27, and a28.

In FIG. 4 is described that the water temperature is fixed by sensor fail detection at 80° C. or $(50-\alpha)°$ C. However, the water temperature can be flexibly set to 80° C. or $(50-\alpha)°$ C.

Thus, fail safe measures can be taken against various malfunctions of the water temperature sensor. Now, ISC, fuel control, and ignition control using a new water temperature setting for water temperature sensor fail, that is, a dummy output signal corresponding to a fixed water temperature at 80° C. or $(50-\alpha)°$ C. in FIG. 4, will be described.

Figure 6:
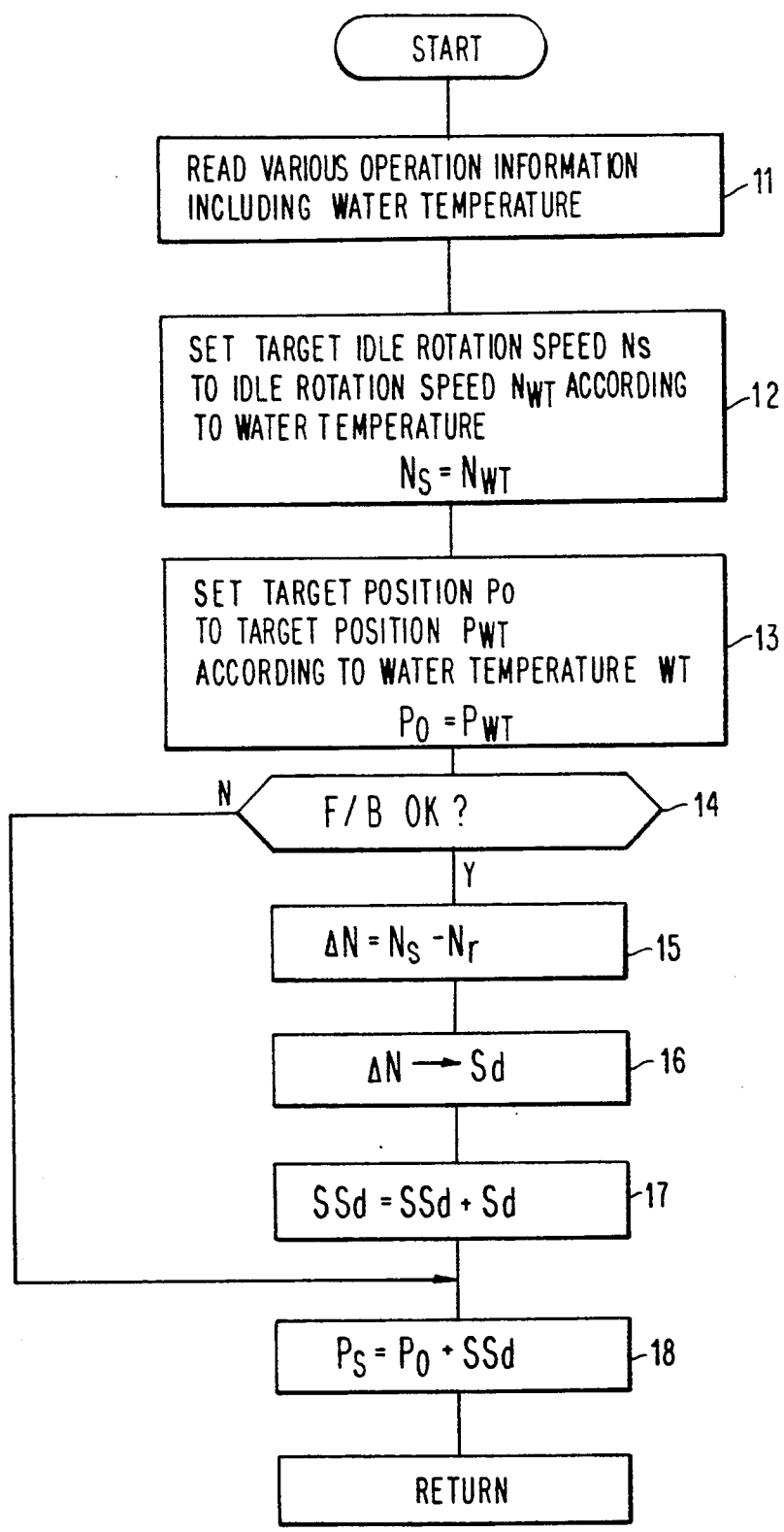
Figure 7:
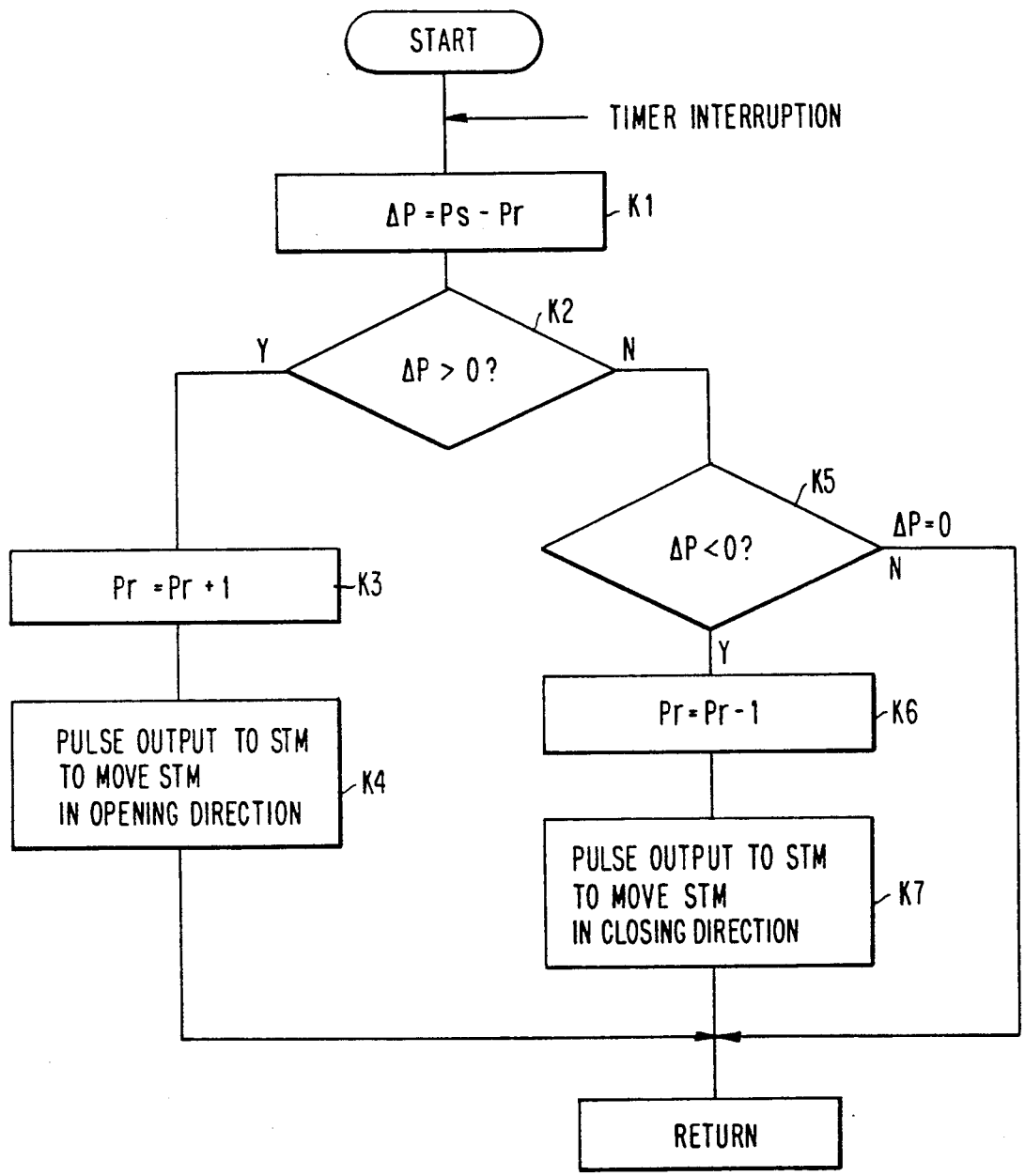
Figure 8:
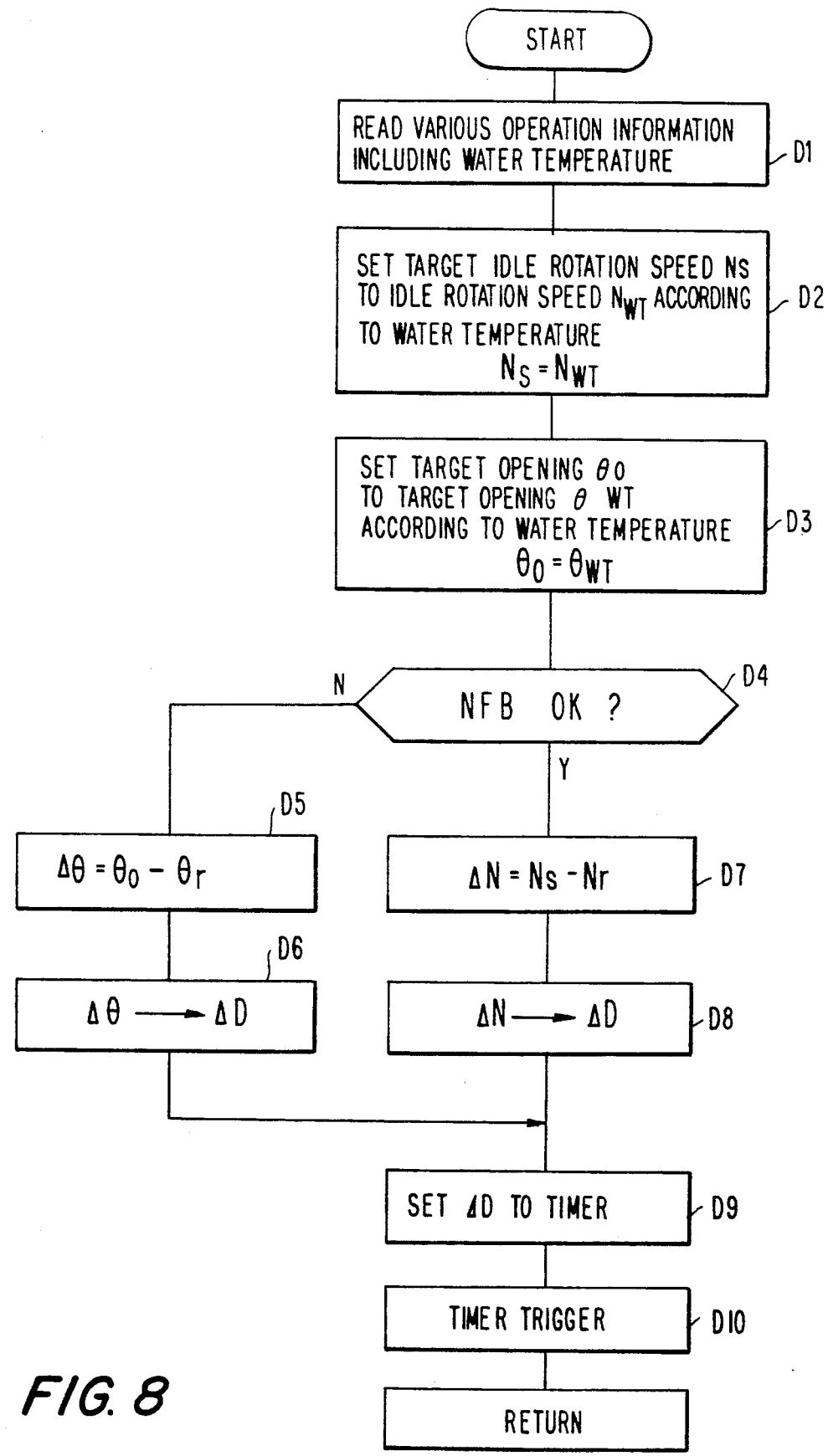

ISC will first be described. FIGS. 6 to 8 are ISC flow charts. FIG. 6 and FIG. 7 are for the case with a bypass corresponding to FIG. 1, and FIG. 8 is for the case with a directly acting feedback corresponding to FIG. 2.

Referring to FIG. 6, when an ISC main routine is executed, various operation information of the input side shown in FIG. 3 including water temperature is read by the ECU (step I1). In this case, when the water temperature sensor is normally operating, the water temperature information is used as is, and, when there is a short circuit, opening circuit, or a permanent addition of resistance, the above-described dummy output information corresponding to $(50-\alpha)°$ C. or 80° C. is used.

In step I2, a target idle rotation speed $N_S$ is set to an idle rotation speed $N_{WT}$ according to the water temperature. In step I3, a target position $P_O$ is set to a target position $P_{WT}$ according to the water temperature WT.

Target positions are bypass valve openings which would give target idle rotation speeds according to individual operation conditions, that is, individual cooling medium temperature conditions, so that engine rotation speeds close to target idle rotation speeds can be obtained without correction by rotation speed feedback. These values are previously experimentally determined and stored as target positions in the map of the ROM. In an embodiment of the present invention, in step I3 in FIG. 6, a corresponding target position data $P_{WT}$ is rad from the ROM map and inputted to the target position address $P_O$. After the target rotation speed and the target position are set, input conditions necessary for feedback control, e.g., idle switch (FIG. 3) ON and a zero interlocking speed.

In step I5, a difference $\Delta N$ between the target rotation speed $N_S$ and an actual rotation speed $N_r$ is determined and, in step I6, a corrected opening Sd according to the difference $\Delta N$ is set. In step I7, a total step number SSd of the stepping motor (22a in FIG. 1) up to the immediately preceding processing is corrected with the corrected opening Sd to determine a new step number SSd as a feedback amount.

The target position $P_0$ is corrected with the new step number SSd (step I8) to determine a new position $P_S$.

FIG. 7 shows a stepping motor driving routine based on the ISC main routine shown in FIG. 6, with a timer interruption. Referring to FIG. 7, differentiation between the new target position $P_S$ and the actual position $P_r$ is executed in step K1 to obtain $\Delta P$. When $\Delta P$ is judged to have a positive value in step K2, the actual position, $P_r$ is incremented in step K3 so that the rotation is advanced by 1 step of the stepping motor, and, in step K4, 1 pulse is outputted to the stepping motor so as to move the bypass in the opening direction.

When, in step K2, $\Delta P$ is judged not to be a positive value, it is further judged in step K5 whether $\Delta P$ is negative or zero. If negative, the actual position $P_r$ is corrected by the processing in step K6 so that rotation of the stepping motor is subtracted by 1 step, and, in step K7, 1 pulse is outputted to the stepping motor so as to move the bypass path in the closing direction.

FIG. 8 shows a direct-acting ISC main routine. Referring to FIG. 8, in step D1, various operation information including water temperature (FIG. 3) is read by the ECU. Then, in step D2, the target idle rotation speed $N_S$ is set to a target idle rotation speed $N_{WT}$ according to the water temperature, and, in step D3, a target opening $\theta_O$ of the throttle valve is set to a target opening $\theta_{WT}$ according to the water temperature. Input conditions necessary for the rotation speed feedback control are judged in step D4. When the conditions are satisfied, a difference $\Delta N$ between the target rotation speed $N_S$ and an actual rotation speed $N_r$ is determined in step D7, and a DC motor driving time $\Delta D$ according to the rotation speed difference $\Delta N$ is determined in step D8.

When the rotation speed feedback control conditions are not satisfied in step D4, processing goes to step D5 where a difference $\Delta\theta$ between the target opening (target position) $\theta_0$ and the actual position $\theta_r$ is determined, and, in step D6, a DC motor driving time $\Delta D$ according to the difference $\Delta\theta$ is determined.

Thus, after the processing in step D6 or D8, the time D is set to a timer (step D9), and a timer trigger is made in step D10.

As a result, the water temperature is reflected to ISC, ISC is executed by a normal water temperature sensor. When a water temperature sensor fail is detected, the water temperature information set in the water temperature sensor fail judgment routine is inputted in step I1 of the ISC main routine, thereby preventing the engine speed from abnormally increasing.

Figure 9:
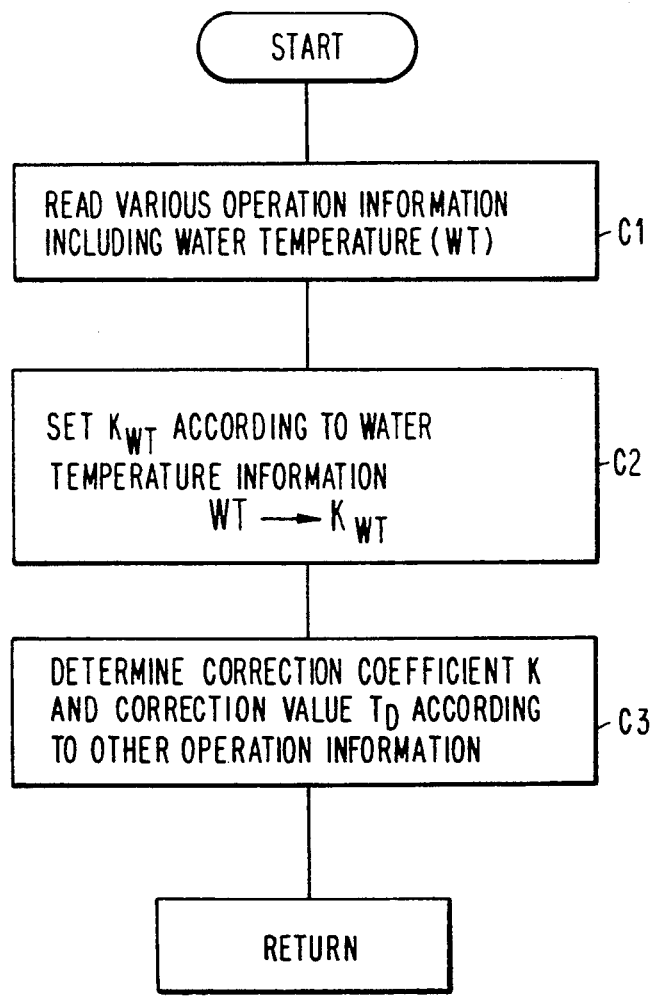

Fuel control will then be described. FIG. 9 shows a fuel control main routine. At the beginning of the program execution, various operation information including water temperature WT is read by the ECU in step C1. In this case, as the previously-described ISC, when the water temperature sensor is operating normally, its output information is used as the water temperature. When a malfunction such as a short circuit, an open ciruit, or a permanent increase in resistance occurs, a dummy output information, for example, corresponding to $(50-\alpha)°$ C. or 80° C. is used.

In step C2, a water amount correction coefficient $K_{WT}$ is set according to the water temperature WT in step C1. In step C3, correction coefficients K (such as $K_{AP}$, $K_{AT}$) and a correction value (delay time) $T_D$ according to other operation information such as an intake air temperature, an atmospheric pressure, a throttle opening and the like are determined. Thus, a fuel injection correction value according to the water temperature is obtained.

Figure 10:
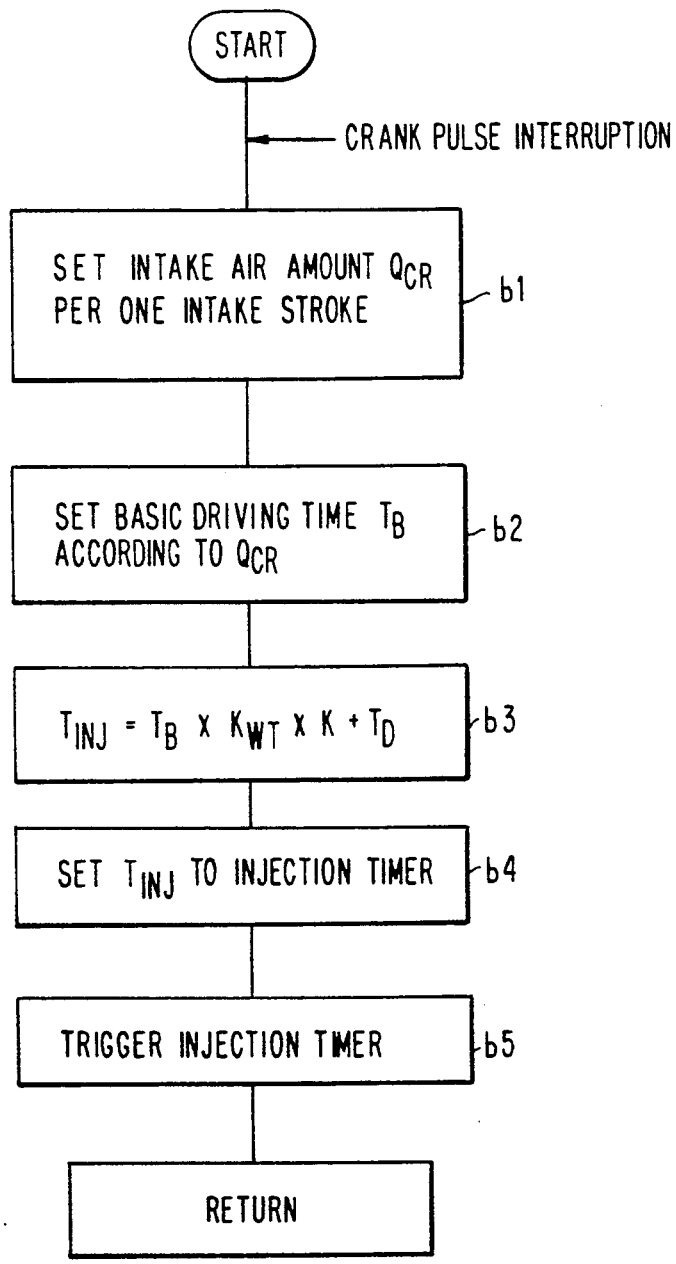

FIG. 10 shows a fuel control subroutine as a fuel injection electromagnetic valve driving routine. This routine is executed by a crank pulse interruption.

When a crank pulse in inputted, an intake air amount $Q_{CR}$ per one intake stroke is set in step b1. Then, in step b2, a basic driving time $T_B$ of fuel injection (injector) is set according to the intake air amount $Q_{CR}$. In step b3, an actual injector driving time $T_{INJ}$ is determined. This determination is made by multiplying the basic driving time in step b2 with the correction coefficient $K_{WT}$ shown in steps C2 and C3 in FIG. 9 and adding the correction time $T_D$. The driving time $T_{INJ}$ is set into an injection timer (step b4), and the injection timer is triggered (step b5). Thus, fuel injection is made by the injector according to the water temperature.

Thus, the water temperature is reflected to fuel control, and fuel control is performed by a normal water temperature sensor. Since the water temperature information set in the water temperature sensor fail judgment routine is inputted in step C1 of the main routine and a low water temperature temperature information despite completion of engine warm-up will not be outputted, enrichment is suppressed, and the mileage and exhaust gas condition can be improved.

Figure 11:
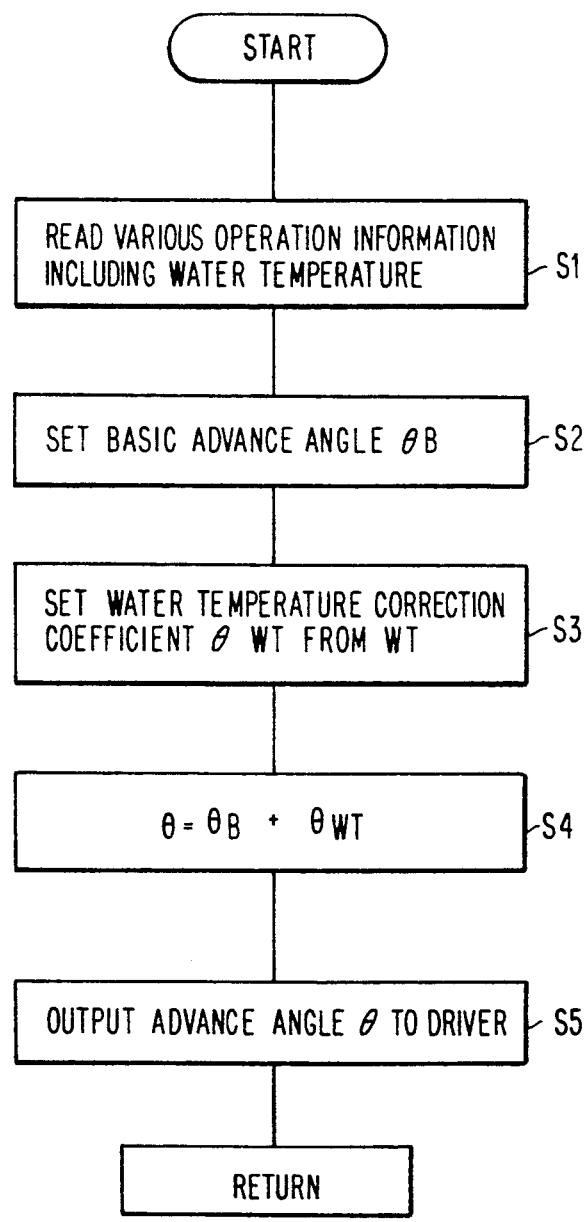
Figure 12:
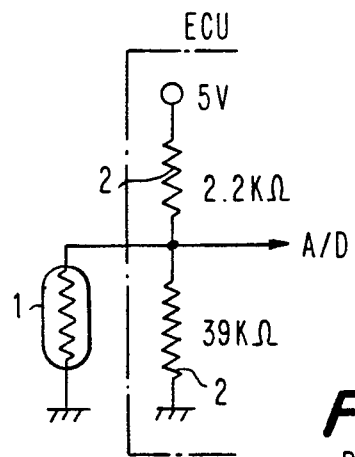
Figure 13A:
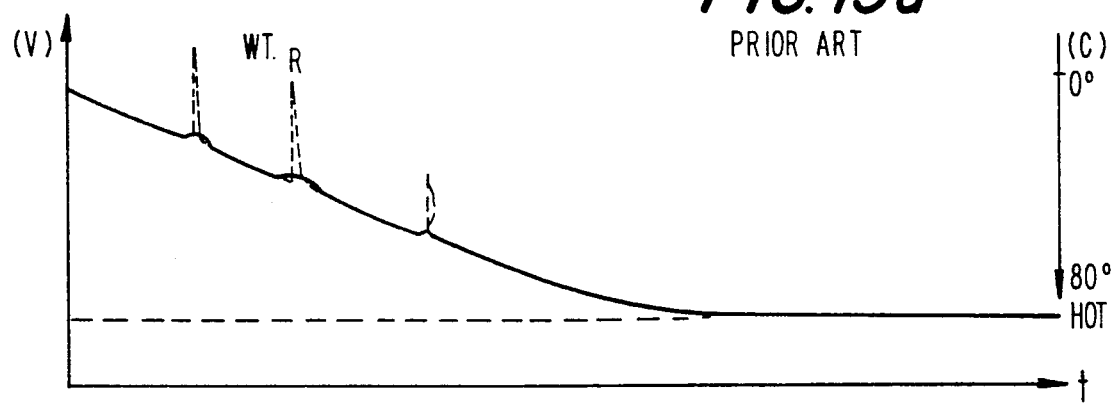
FIGS. 13(A) and 13(B) are schematic views showing a momentary cut-off.
Figure 13B:
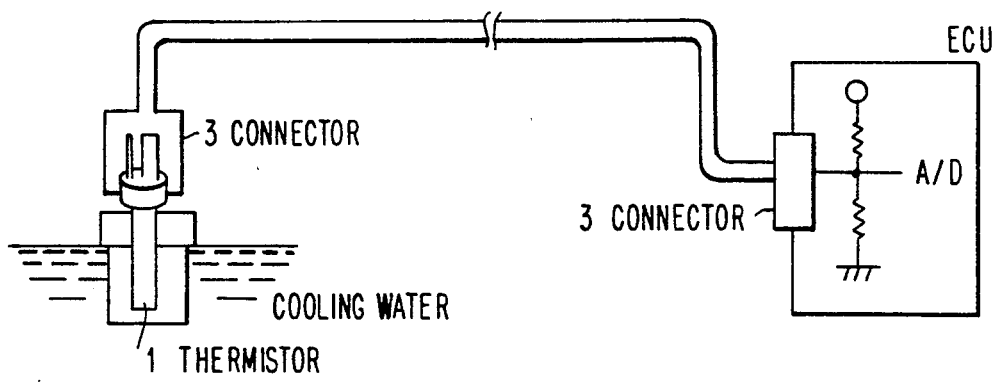
Figure 14A:
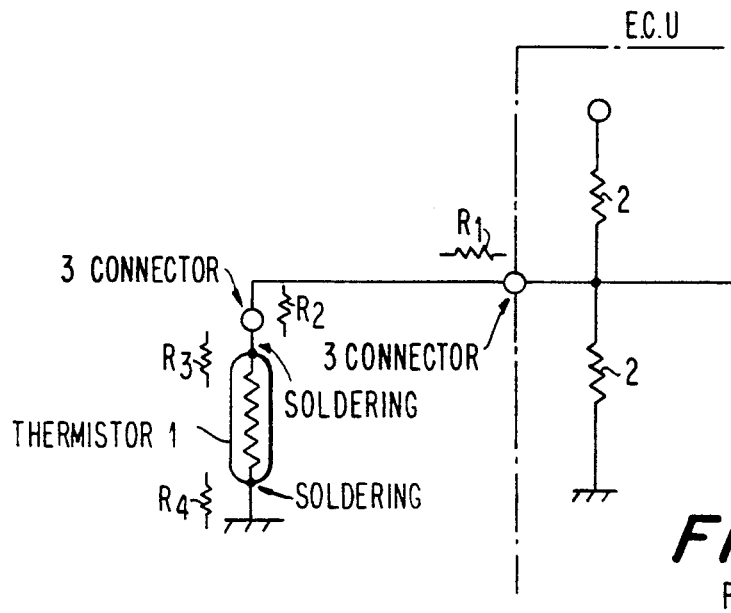
FIGS. 14(A) and 14(B) are schematic views showing resistances added to a water temperature sensor.
Figure 14B:
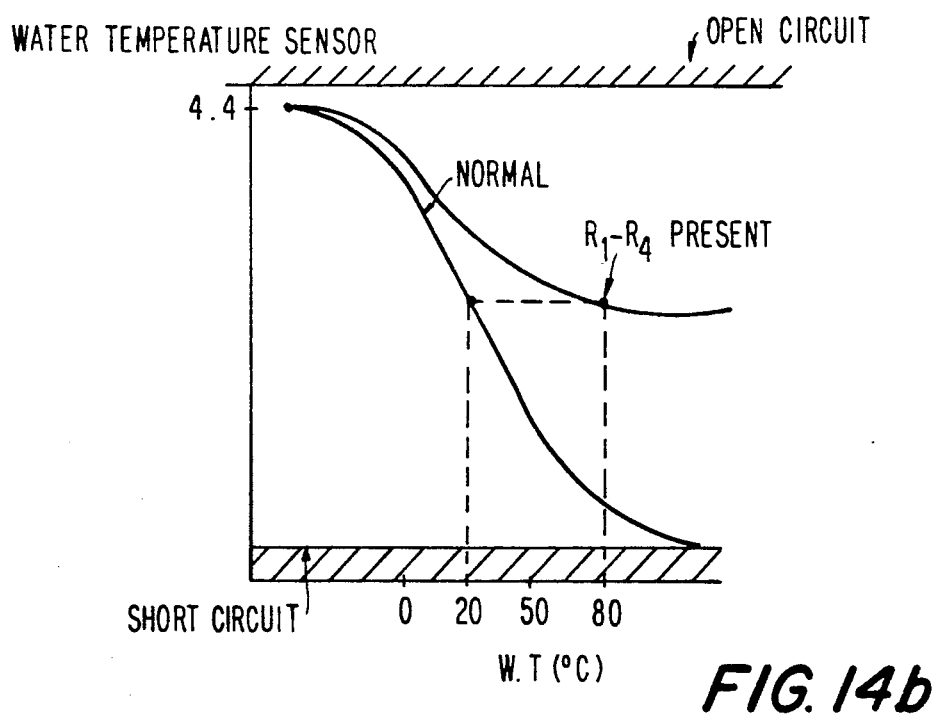

Ignition control will now be described. FIG. 11 shows an ignition control routine. Referring to FIG. 11, various operation information including water temperature and intake air amount is read in step S1. Also in this case the output information by a normal water temperature sensor is used as a water temperature, and, in case of a malfunction such as a short circuit, an open circuit, or a permanent increase in resistance, a dummy output information, for example, corresponding to $(50-\alpha)°$ C. or 80° C. is used.

In step S2, a basic advance angle $\theta_B$ is determined from a map of Q/N against N. In this case, Q/N is a value which is determined by the intake air amount and the engine speed, and, Q/N is determined when the intake air amount is determined. After the basic advance angle $\theta_B$ is determined, a water temperature correction coefficient $\theta_{WT}$ is set from the water temperature WT in step S3. In step S4, a final target advance angle $\theta$ is set. This target advance angle $\theta$ is obtained by adding a correction value $\theta_{WT}$ to the basic advance angle $\theta_B$. Then, in step S5, the advance angle $\theta$ is outputted to a driver. The driver operates a power transistor at a timing corresponding to the advance angle $\theta$ to make ignition.

Thus, ignition control is made not only with normal water temperature information but also since water temperature information set by the water temperature sensor fail judgment routine is inputted in step S1, the ignition timing is not moved to the advance side, thereby preventing occurrence of a knocking.

As described above, with the present invention, since a malfunction of the water temperature sensor due to an increase in resistance can be detected in addition to a short circuit and an open circuit and the water temperature sensor output can be fixed at a predetermined value, an engine control device can be positively controlled. When the engine control device is an idle rotation speed control device, the engine speed can be fixed at a predetermined value even at a water temperature sensor fail due to an increase in resistance, thereby preventing the engine speed from increasing over a desired value. When the engine control device is a fuel control device, enrichment of the fuel can be suppressed, thereby improving the mileage and exhaust gas quality. When the engine control device is an ignition timing control device, advance of the ignition timing can be suppressed, thereby preventing occurrence of a knocking.

What is claimed is:

1. A fail safe device for a temperature sensor with an engine control device for controlling an engine in response to an output from said temperature sensor for detecting a coolant temperature of the engine, comprising temperature sensor output monitoring means for monitoring an output of said temperature sensor, and dummy signal outputting means for outputting a dummy signal corresponding to a setting temperature in place of an output signal from said temperature sensor to said engine control device when said temperature sensor output monitoring means detects that a temperature of said temperature sensor changes to a lower side than said setting temperature set equal to or lower than an after-warm-up temperature of the engine.

2. The fail safe device of claim 1
wherein said temperature sensor is a thermistor of which a resistance varies in response to a change in coolant temperature.

3. A fail safe device for a temperature sensor with an engine control device for controlling an engine in response to an output from said temperature sensor for detecting a coolant temperature of the engine, comprising temperature sensor output monitoring means for monitoring an output of said temperature sensor, temperature sensor fail judging means for judging said temperature sensor to be failed when said temperature sensor output monitoring means detects that said temperature sensor does not indicate an output corresponding to a temperature increase for a predetermined period of time after said temperature sensor indicates a temperature higher than a setting temperature set lower than the after-warm-up temperature of the engine and then a temperature lower than the setting temperature, and dummy signal outputting means for outputting a dummy signal corresponding to a predetermined temperature in place of an output signal from said temperature sensor to said engine control device when said temperature sensor is judged as failed by said temperature sensor fail judging means.

4. A fail safe device for a temperature sensor with an engine control device for controlling an engine in response to an output from said temperature sensor for detecting a coolant temperature of the engine, comprising temperature sensor output monitoring means for monitoring an output of said temperature sensor, and dummy signal outputting means for outputting a dummy signal corresponding to a second setting temperature set lower than a first setting temperature set to a lower side than an after-warm-up temperature of the engine in place of an output signal from said temperature sensor to said engine control device when said temperature sensor output monitoring means detects that said temperature sensor indicates a temperature lower than the second setting temperature after said temperature sensor indicates a temperature higher than the first setting temperature.

5. The fail safe device of claim 4 wherein said engine control device comprises an ignition timing control device for controlling an ignition device for igniting an air/fuel mixture supplied to the engine by at least an output signal from said temperature sensor.

6. The fail safe device of claim 4 wherein said temperature sensor is a thermistor of which a resistance varies in response to a change in coolant temperature.

7. A fail safe device for a temperature sensor with an engine control device for controlling an engine in response to an output from said temperature sensor for detecting a coolant temperature of the engine, comprising temperature sensor output monitoring means for monitoring an output of said temperature sensor, temperature sensor fail judging means for judging said temperature sensor to be failed when said temperature sensor output monitoring means detects that said temperature sensor does not indicate an output corresponding to a temperature increase for a predetermined period of time after said temperature sensor indicates a temperature higher than a first setting temperature set lower than an after-warm-up temperature of the engine and then a temperature lower than a second setting temperature set lower than the first setting temperature, and dummy signal outputting means for outputtting a dummy signal corresponding to a predetermined temperature in place of an output signal from said temperature sensor to said engine control device when said temperature sensor is judged as failed by said temperature sensor fail judging means.

8. A fail safe device for a temperature sensor with an engine control device for controlling an engine in response to an output from said temperature sensor for detecting a coolant temperature of the engine, comprising temperature sensor output monitoring means for monitoring an output of said temperature sensor during operation of the engine, temperature sensor fail judging means for judging said temperature sensor to be failed when said temperature sensor output monitoring means detects that said temperature sensor has an output indicating a temperature equal to or lower than a setting temperature lower than said after-warm-up temperature of the engine and does not indicate a change in output corresponding to an increase in temperature for a predetermined period of time while said temperature sensor is outputting a signal corresponding to the coolant temperature during the operation of the engine, and dummy signal outputting means for outputting a dummy signal corresponding to a predetermined temperature in place of an output signal from said temperature sensor to said engine control device when said temperature sensor is judged as failed by said temperature sensor fail judging means.

9. The fail safe device of claim 8 wherein said dummy signal outputting means outputs a value indicative of said after-warm-up temperature to said engine control device when said temperature sensor fail judging means judges a failure of said temperature sensor.

10. The fail safe device of claim 8, wherein said temperature sensor fail judging means judges a temperature sensor fail when said temperature sensor output monitoring means detects that said temperature sensor outputs a value indicative of a temperature equal to or lower than said setting temperature at the beginning of engine operation and does not indicate a change in output corresponding to an increase in temperature for a predetermined period of time after the beginning of engine operation.

11. The fail safe device of claim 10 wherein said engine control device comprises an idle rotation speed control device for transmitting an operation signal controlled at least by an output signal from said temperature sensor to an intake air amount control valve controlling actuator of the engine to adjust an opening of said intake air amount control valve and control an idle rotation speed of the engine, and said idle rotation speed control device has engine speed fixing means for fixing an idle rotation speed of the engine to a predetermined value based on said dummy signal from said dummy signal outputting means.

12. The fail safe device of claim 10 wherein said engine control device comprises a fuel control device for controlling a fuel supply device for supplying fuel to the engine by at least an output signal from said temperature sensor.

13. The fail safe device of claim 12 further comprising temperature sensor fail judging means for judging said temperature sensor to be failed when said temperature sensor output monitoring means detects that said temperature sensor does not indicate an output corresponding to an increase in temperature for a predetermined period of time after said temperature sensor indicates a temperature higher than said setting temperature and then indicates a temperature lower than said setting temperature.

14. The fail safe device of claim 13 wherein said dummy signal outputting means outputs a value corresponding to an after-warm-up temperature equal to or higher than said setting temperature to said engine control device when said temperature sensor fail judging means judges said temperature sensor fail.

15. The fail safe device of claim 14 further comprising temperature sensor fail judging means for judging said temperature sensor to be failed when said temperature sensor output monitoring means detects that said temperature sensor does not indicate an output corresponding to a temperature increase for a predetermined period of time after said temperature sensor indicates a temperature higher than the first setting temperature and then a temperature lower than the second setting temperature.

16. The fail safe device of claim 15 wherein said dummy signal outputting means outputs a value corresponding to an after-warm-up water temperature equal to or higher than said second setting water temperature to said engine control device when said temperature sensor fail judging means judges said temperature sensor fail.

17. The fail safe device of claim 13 wherein said engine control device comprises an idle rotation speed control device for transmitting an operation signal controlled at least by an output signal from said temperature sensor to an intake air amount control valve controlling actuator of the engine to adjust an opening of said intake air amount control valve and control an idle rotation speed of the engine, and said idle rotation speed control device has engine speed fixing means for fixing an idle rotation speed of the engine to a predetermined value when an output signal is received from said dummy signal outputting means.

18. The fail safe device of claim 10 wherein said engine control device comprises an ignition timing control device for controlling an ignition device for igniting an air/fuel mixture supplied to the engine by at least an output signal from said temperature sensor.

19. The fail safe device of claim 8 wherein said temperature sensor fail judging means judges a temperature sensor fail when said temperature sensor output monitoring means detects that said temperature sensor has an output indicating a temperature equal to or lower than an after-warm-up temperature of the engine and does not indicate a change in output corresponding to an increase in temperature for a predetermined period of time.

20. The fail safe device of claim 8 wherein said temperature sensor fail judging means judges a temperature sensor fail when said temperature sensor output monitoring means detects that said temperature sensor does not indicate a change in output corresponding to an increase in temperature for a predetermined period of time after the beginning of engine operation.

21. The fail safe device of claim 8 wherein said temperature sensor is a thermistor of which a resistance varies in response to a change in coolant temperature.

* * * * *